April 12, 1932.   G. D. HARRIS   1,853,421
HUMIDIFYING DEVICE
Filed July 8, 1927   3 Sheets-Sheet 1
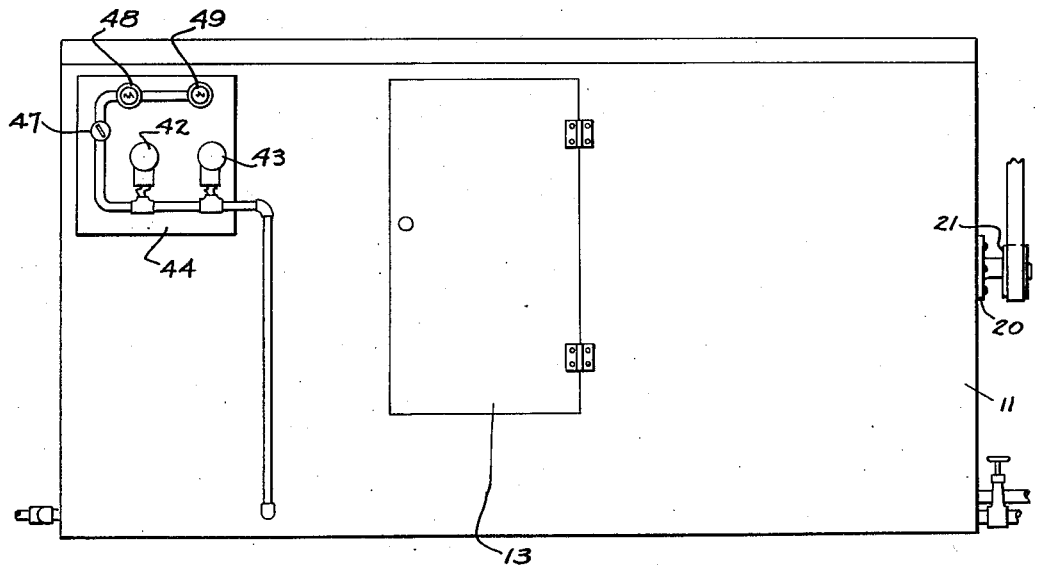
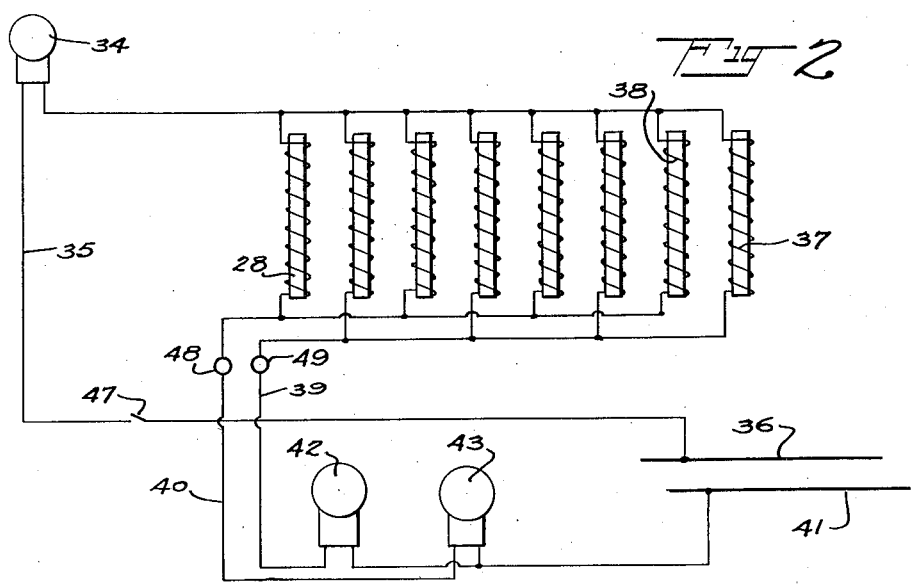
INVENTOR.
Gordon D. Harris
BY H. P. Lee
ATTORNEY.

April 12, 1932.　　G. D. HARRIS　　1,853,421
HUMIDIFYING DEVICE
Filed July 8, 1927　　3 Sheets-Sheet 2

INVENTOR.
Gordon D. Harris.
BY
ATTORNEY.

April 12, 1932.  G. D. HARRIS  1,853,421
HUMIDIFYING DEVICE
Filed July 8, 1927    3 Sheets-Sheet 3
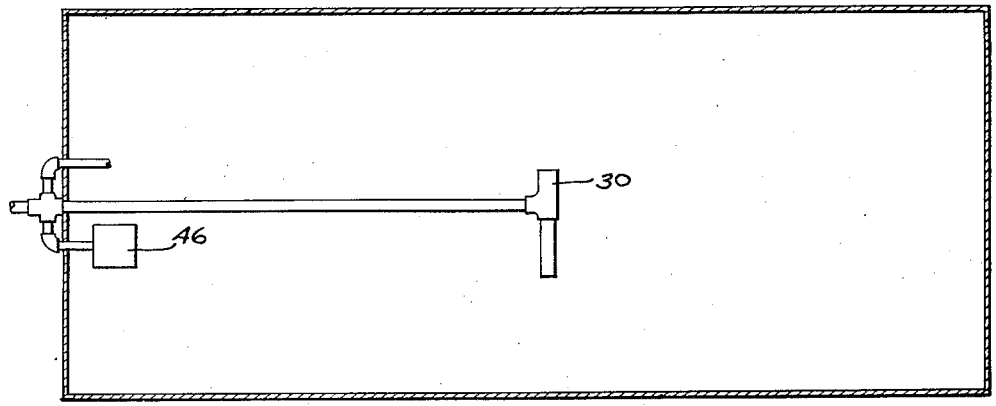
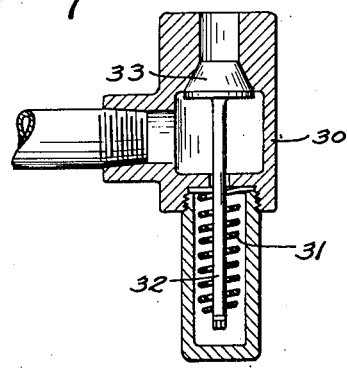
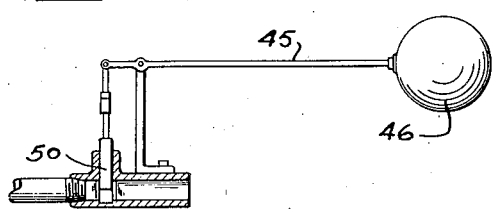
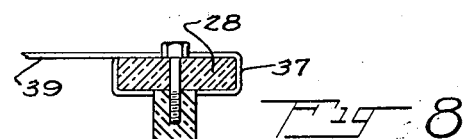
INVENTOR.
Gordon D. Harris
BY
ATTORNEY.

Patented Apr. 12, 1932

1,853,421

UNITED STATES PATENT OFFICE

GORDON D. HARRIS, OF STAMFORD, CONNECTICUT, ASSIGNOR TO THE INDUSTRIAL DRYER CORPORATION OF STAMFORD, CONNECTICUT, A CORPORATION OF CONNECTICUT

HUMIDIFYING DEVICE

Application filed July 8, 1927. Serial No. 204,157.

This application is directed to apparatus capable of carrying out the method set forth in my copending application Serial No. 204,507, filed July 9, 1927.

This invention relates generally to means for humidifying or conditioning any desired material and more particularly to an apparatus in which air heated to a definite and controlled temperature and humidified substantially to complete saturation is caused to circulate in contact with the material to be treated in order to impart its content of moisture thereto.

In my prior application for Letters Patent, Serial No. 81,606, filed January 15th, 1926, there is described and claimed a humidifying apparatus which includes a chamber adapted to receive the material to be treated and a tunnel-like passageway mounted beneath the floor of the chamber. The passageway contains a body of water and a series of moisture absorbing surfaces dipping into the water. Means were provided for circulating a mass of air through the passageway along the surface of the water and into the chamber. Means for heating the circulating mass of air were provided which imparted heat units to the moving stream of air adjacent to the point where the air entered the tunnel-like passageway. With this structural arrangement heat units carried by the air were interchanged for moisture units as the air passed through the passageway, the moisture being taken up from the substantial areas of moistened surfaces arranged in the passageway. The air emerging from the other end of the passageway was humidified to its full capacity and the humidified air was immediately passed into the chamber to impart its moisture content to the material therein.

I have found that I can improve upon the apparatus referred to by eliminating the moisture absorbent surfaces in the passageway and bring about a corresponding simplification of the structure. In addition, a regulation and control of the temperature of the humidified air can be attained to adjust the conditions of temperature and humidification to the precise requirements of the material to be treated.

The invention comprises a humidifying or conditioning apparatus which includes a housing structure having therein a humidifying chamber in which the material to be treated may be placed. The walls of the chamber are spaced apart from the end walls and from the bottom wall of the housing in which the chamber is included. One end of the chamber is provided with an opening in which a fan or other air moving means is arranged to operate. The use of a fan or similar means to circulate the air may be dispensed with, although desirable under most conditions. The other end wall of the chamber is provided with outlet ports through which air passes from the chamber and ultimately through the passageway for recirculation through the chamber. The tunnel-like passageway beneath the chamber is arranged to hold a body of water with a relatively extensive exposed surface having substantially the dimensions of the entire housing.

Instead of heating the air directly as in the prior application referred to, I provide means mounted within the body of water itself for applying heat directly thereto. By applying heat in this way heated particles of moisture in vapor form are transferred from the body of water to the mass of air in contact with the surface thereof. This transfer of moisture to the air also has the effect of raising the temperature of the air and this in turn results in an interchange of heat units for additional units of moisture. The result is that, as the air stream travels through the passageway along the surface of the water, its temperature and its content of moisture are gradually increased until at the outlet end of the passageway the air has been raised in temperature to substantially the temperature of the water and has become charged to its maximum capacity with moisture.

The completely or substantially completely humidified mass of air which emerges from the passageway is immediately driven by the action of the fan into the chamber where it comes into contact with the material therein and gives up moisture thereto.

The transfer of moisture to the material is effected by the penetration of the air with its content of water in gaseous form into the pores and interstices of the material, it being clear that the water in vapor form is converted into water in liquid form and deposited in the material. The air passes from the discharge end of the chamber into the entrance end of the passageway to repeat the cycle of operation.

By properly proportioning the cross section of the path of flow of air through the tunnel-like passageway to the area of the surface of the body of water therein, the producing of temperature conditions in the air stream substantially the same as that in the body of water and also the substantially complete humidification of the air stream can be accomplished at the point where the air stream emerges from the passageway. By this arrangement, a definite control of humidity and temperature conditions in the humidifying mass of air can be obtained by a definite control and regulation of the temperature conditions in the body of water within the passageway. This control of temperature conditions in the water is automatically produced through a thermostatic device.

Supplemental control and regulation of the process may be provided through the use of timing mechanism which functions to cut off the operation of the apparatus at the end of a predetermined period of time. Timing mechanism may also be employed to cut off the additional or special heating units, when employed in the initial heating operation to expedite heating the water.

Other features of the invention will appear from the following description, including the drawings.

In the drawings, in which a preferred embodiment of the invention has been selected for illustration:

Figure 1 is a view in front elevation of a material conditioning or humidifying device embodying the invention;

Figure 2 is a diagrammatic view of an electrical circuit system forming part of the invention;

Figure 5 is a view somewhat similar to Figure 4 showing a structural arrangement for controlling the supply of water to the device;

Figure 6 is a view in vertical section showing a float controlled valve device which may be used in the structural arrangement shown in Figure 5;

Figure 7 is a sectional view on an enlarged scale of a thermostat controlled valve forming part of the structure shown in Figure 5;

Figure 8 is a view in vertical section and on an enlarged scale of a supporting standard for a heating element shown in Figure 4.

Figure 3:
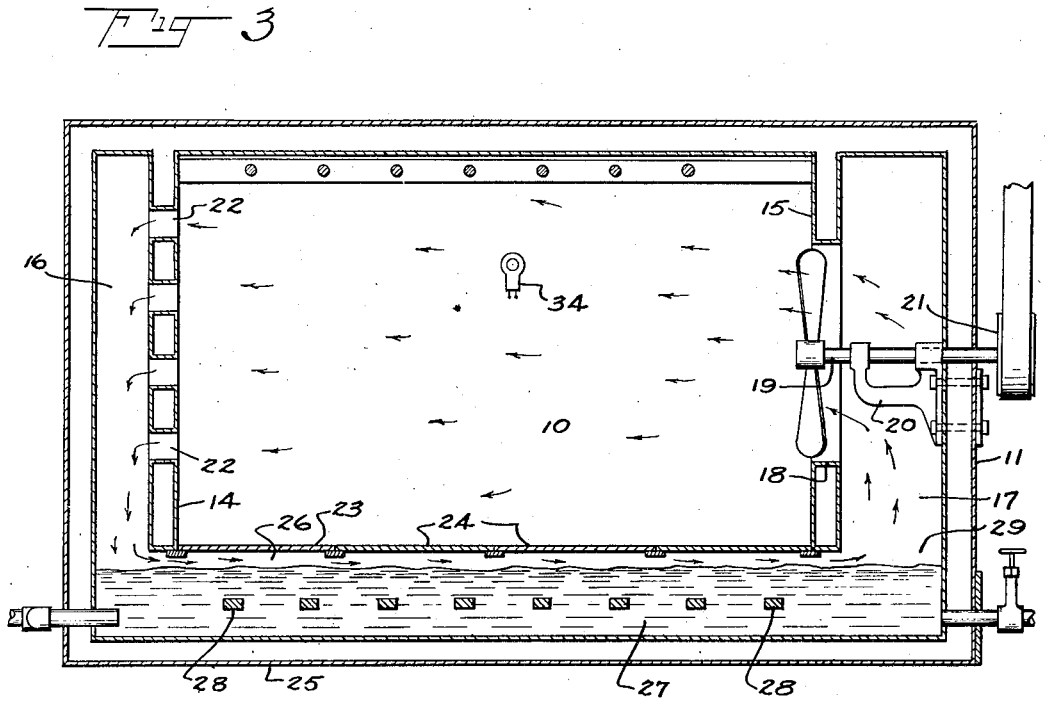
Figure 3 is a view in longitudinal vertical section of the device shown in Figure 1.
Figure 4:
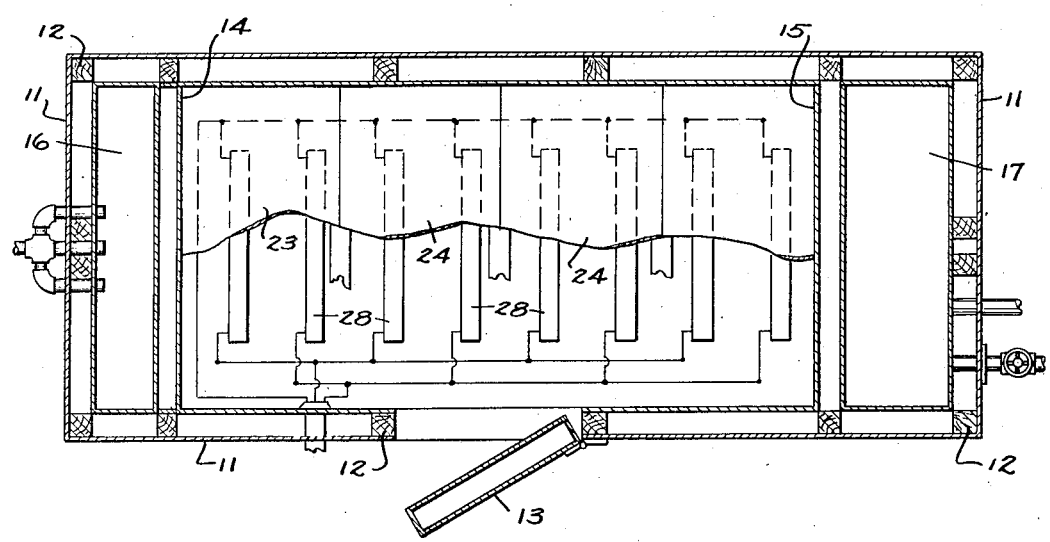
Figure 4 is a view in horizontal section of the device shown in Figure 3.

Referring to the drawings for a more detailed description of the invention, a humidifying device is shown in Figures 1, 3 and 4 of the drawings, which comprises a chamber 10 formed by hollow wall members 11, preferably formed of sections of sheet metal or the like, attached to frame pieces 12. Such hollow wall construction effectively insulates the chamber 10 against the interchange of heat between the chamber and the outer air.

Preferably, the humidifying or conditioning device shown is constructed on a sufficiently large scale to hold a considerable quantity of material to be treated, such as leather. The chamber is provided with door 13 in one of the longer side walls to provide access to the interior of the chamber, to effect the interchange of material as one batch of material is finished and a fresh batch is placed in the chamber for treatment.

Chamber 10 is provided with end walls 14 and 15, spaced from the end walls of the device as a whole to provide vertical passageways 16 and 17. End wall 15 of the chamber 10 has a circular opening, in which a fan 18 is mounted, the fan being carried on a shaft 19 supported in a bearing 20 which passes through the end wall 11 of the structure and terminates in a pulley 21 which may be driven from any suitable source of power. The other end wall 14 of the chamber 10 is provided with a number of openings 22 through which air may pass from the chamber 10 into the passageway 16 at the left hand end thereof.

Floor structure 23 of chamber 10 comprises removable panels or sections 24 and is spaced vertically above floor structure 25 of the humidifier structure as a whole, to provide a tunnel-like passageway beneath the floor of the chamber 10. This passageway is adapted to hold a supply of water 27, which is preferably maintained at a level to provide an air space 26 between the upper surface of the water and the lower surface of floor structure 23. This air space 26 forms a passageway through which air is circulated, to receive a supply of moisture which is then conveyed by the air into humidifying chamber 10.

In order to heat the water 27 to cause the water to give off water vapor or water in gaseous form into the air flowing through passage 26, heaters 28 are provided which are immersed within the mass of water 27 to apply heat directly thereto. These heaters may be of the electrical type or of any other suitable type adapted for immersion within the water itself.

The air stream flowing through the passageway 26 will not only be effectively heated by transfer thereto of water vapor from the heated body of water 27, but the moisture content of the stream of air will also be raised to its maximum extent. Thus, air issuing from the discharge end 29 of the passageway 26 will be at a maximum degree of humidity, so that the air entering chamber 10 is charged with substantially all the moisture that the air will hold for that temperature. In addition to charging the air with a maximum content of moisture, the air is also heated to a temperature approximating that of the body of water 27. Thus, by regulating and controlling the temperature of the mass of water 27 a corresponding regulation and control of the moisture charged air entering the chamber 10 is provided. By means of this regulation and control a temperature of moisture charged air best suited to the nature of the material being treated may be obtained.

A thermostat device 30 may be employed for regulation and control of the temperature conditions of the water 27, when the temperature thereof has risen to an undue extent. In operation if the temperature of the water exceeds the predetermined fixed temperature the valve of the thermostat device will open admitting fresh cold water thus to cool the body of water. Thermostat 30 may include a thermostat coil 31 having co-operative relation with the stem 32 of a valve 33, the thermostat functioning to withdraw the valve from its seat admitting cool water when the temperature of the water in which the device is immersed has become heated above the predetermined temperature.

An additional temperature control may be provided through the use of thermostat 34, which may be mounted within the conditioning chamber 10 and included in the circuit connection 35 leading from one of the supply conductors 36 through the heating coils 37 and 38, by which the heaters 28 are actuated. The other sides of coils 37 and 38 are connected to conductors 39 and 40 and to the other supply line conductor 41.

The two sets of heater coils 37 and 38 arranged in alternate order in the series are preferably provided, when it is desired to bring up the temperature of the water 27 to a working temperature in the shortest possible period of time. When the working temperature has been reached, one of the sets of coils 37 or 38 may be eliminated.

This result may be accomplished by the use of circuit controllers 42 and 43 mounted on a panel 44 on the exterior surface of the device in a position convenient for operation by an attendant. Controllers 42 and 43 are of the time controller type and each one may be set for causing current to flow through the corresponding heating coils for a predetermined period of time. For example, both controllers 42 and 43 may be adjusted at the same time, one being adjusted to cut off current to one set of heating coils at the end of a brief interval of time, such as one hour. The other controller may at the same time be adjusted to shut off current to the set of coils which it controls at the end of a longer period of time, which will be sufficient to humidify or condition the material in the chamber 10.

In addition to the temperature control means for admitting fresh water to the supply 27, I may provide means for maintaining the level of water through a float valve device such as shown in Figure 6 of the drawings. This device includes a simple form of valve 50 which is supported on a lever arm 45 which carries at its other end a float member 46. Thus fresh water will be admitted to the tank either to replenish the supply when the water level becomes too low or to cool the water in the tank when the temperature exceeds the predetermined limit.

An electric switch 47 mounted on the panel 44 may be used to manually control the supply of current to the heating coils 37 and 38. Preferably, indicating lamps 48 and 49 are also mounted on the panel 44 to show the operative condition of the controllers 42 and 43.

The apparatus described and claimed will accomplish a very efficient conditioning of material, because air charged with moisture to its utmost capacity and under temperature conditions best suited to the treatment of the material in the chamber can be supplied to the chamber in the form of a moving stream, which is constantly renewed until the desired condition of humidification has been reached.

What I claim is:

1. In a material conditioning device, means for moving a relatively thin stream of air along the surface of a body of water whose surface area is sufficiently extensive to insure complete saturation of the air passing thereover, a plurality of sets of heating coils immersed in the water for heating the same, and connected with a source of current time controlled means for controlling the operation of the heating coils whereby to cut off the supply of current to a portion of the coils when the temperature of the water has been brought up to a predetermined degree and of the remaining coils when the conditioning operation has been completed, and means for directing the humidified air into contact with the material to be treated.

2. In a material conditioning device, means for moving a relatively thin stream of air along the surface of a body of water whose surface area is sufficiently extensive to insure complete saturation of the air stream passing thereover, heating coils immersed in the body of water for heating the same, time controlled means for regulating the operation of the heating coils, temperature controlled means for regulating the operation of the heating coils, and means for directing the humidified air into contact with the material to be treated.

3. In a material conditioning device, means for moving a relatively thin stream of air along the surface of a body of water whose surface area is sufficiently extensive to insure complete saturation of the air stream passing thereover, heating coils immersed in the water for heating the same, temperature responsive means immersed in the water for controlling the addition of cold water thereto, a float controlled valve for regulating the level of the body of water, and means for directing the humidified air into contact with the material to be treated.

4. In a humidifying device, a chamber adapted to receive the material to be treated, a tunnel-like horizontal passageway communicating at its opposite ends with opposite ends of the chamber, means for causing air to flow through a closed circuit including the passageway and the chamber, said passageway adapted to contain a body of water having its surface exposed to the air flowing through the passageway, heating devices immersed in and covered by the water for heating the water to thereby transfer heat and moisture from the water to the air, the contact of the flowing air with the water in the passageway being sufficiently prolonged to insure that the air will be heated to the same temperature as that of the water and that the air will contain a maximum content of moisture for that temperature, and regulating means for automatically maintaining the temperature of the water at a predetermined degree.

5. A material-conditioning apparatus comprising means for heating a body of liquid, means for utilizing the heated liquid to humidify a conditioning gas and time controlled means for supplying a larger number of heat units to the liquid during the primary stage of the conditioning operation.

6. A material-conditioning apparatus comprising means for heating a body of liquid, means for utilizing the heated liquid to both humidify and heat a conditioning gas and time controlled means for supplying a larger number of heat units to the liquid for a predetermined time during the initial period of the conditioning operation.

7. A materal-conditioning apparatus comprising a plurality of electric heating units for heating a body of liquid, means for utilizing the heated liquid to humidify a conditioning gas, a source of electric current, a plurality of electric circuits connected to said heating units and said source and automatic control means to break the circuit to some of said heating units a certain predetermined time after being placed in operation.

8. A material-conditioning apparatus comprising a plurality of electric heating units for heating a body of liquid, means for utilizing the heated liquid to humidify a conditioning gas, a source of electric current, a plurality of electric circuits connected to said heating units and said source and automatic control means to break the circuit to some of said heating units a certain predetermined time after the start, and thermostatic control means for preventing the temperature rising beyond a predetermined limit.

9. A material-conditioning device comprising means for heating a body of liquid, means to cause a conditioning gas to contact with the surface of the body of liquid to supply the necessary heat and humidity to the conditioning gas and temperature control means to effect a change of liquid when a certain temperature thereof is reached.

10. A material-conditioning apparatus comprising means for heating a body of liquid and means to cause the liquid body and a conditioning gas to contact to supply the necessary heat and humidity to the conditioning gas, means for supplying liquid to said apparatus, a valve in said supply means and means affected by the temperature of the liquid to operate the valve to admit cool liquid.

11. A material-conditioning device comprising means for heating a body of liquid, means to cause a conditioning gas to contact with the surface of the body of liquid to supply the necessary heat and humidity to the conditioning gas and temperature control means to effect a change of liquid when a certain temperature thereof is reached and other means to supply liquid to maintain the level of liquid substantially constant.

12. In a humidifying device, a chamber adapted to receive material to be treated, a tunnel like passageway communicating at its opposite ends with opposite ends of the chamber, means for causing air to flow through a closed circuit including the passageway and the chamber, said passageway containing a body of water having its surface exposed to the air flowing through the circuit, means for heating the water to transfer heat and moisture to the air, and time controlled means for controlling the operation of the heating means.

13. In a humidifying device, a chamber adapted to receive material to be treated, a tunnel like passageway communicating at its opposite ends with opposite ends of the chamber, means for causing air to flow through a closed circuit including the passageway and the chamber, said passageway containing a body of water having its surface exposed to the air flowing through the circuit, means for heating the water to transfer heat and moisture to the air, an electrical circuit associated with the heating means for energizing the same, time controlled means for supplying an excessive amount of current to the heating means for a predetermined time, and other time controlled means for limiting the operation of the heating means.

14. In a humidifying device, a chamber adapted to receive material to be treated a tunnel like passageway communicating at its opposite ends with opposite ends of the chamber, means for causing air to flow through a closed circuit including the passageway and the chamber, said passageway containing a body of water having its surface exposed to the air flowing through the circuit, means for heating the water to transfer heat and moisture to the air, an electrical circuit associated with the heating means for energizing the same, time controlled means for supplying an excessive amount of current to the heating means for a predetermined time, other time controlled means for limiting the operation of the heating means, and means for preventing the temperature of the body of water exceeding a predetermined degree.

15. In a humidifying device, a chamber adapted to receive material to be treated, a tunnel like passageway communicating at its opposite ends with opposite ends of the chamber, means for causing air to flow through a closed circuit including the passageway and the chamber, said passageway containing a body of water having its surface exposed to the air flowing through the circuit, means for heating the water to transfer heat and moisture to the air, an electrical circuit associated with the heating means for energizing the same, time controlled means for supplying an excessive amount of current to the heating means for a predetermined time, other time controlled means for limiting the operation of the heating means, means for preventing the temperature of the body of water exceeding a predetermined degree, and means for supplying cool water to the water body to prevent the body of water reaching an excessive temperature.

16. A material conditioning apparatus comprising a plurality of electric heating units for heating a body of liquid, means for utilizing the heated liquid to humidify a conditioning gas, a source of electric current, a plurality of electric circuits connected to said heating units and said source, automatic control means to break the circuit to some of said heating units a certain predetermined time after being placed in operation, and means for supplying cold water to the water body upon the temperature of the same exceeding a predetermined degree.

17. A material conditioning apparatus comprising a plurality of electric heating units for heating a body of liquid, means for utilizing the heated liquid to humidify a conditioning gas, a source of electric current, a plurality of electric circuits connected to said heating units and said source, automatic control means to break the circuit to some of said heating units a certain predetermined time after the start, thermostatic control means for preventing the temperature rising beyond a predetermined limit, and means for supplying cold water to the water body upon the temperature of the same exceeding a predetermined degree.

18. In a humidifying device, a chamber in which to place the material to be treated, a tunnel like horizontal passageway communicating at its opposite ends with opposite ends of the chamber, means for causing air to flow through a closed circuit including the passageway and the chamber, said passageway containing a body of water having its surface exposed to the air flowing through the passageway, heating devices immersed in and covered by the water for heating the water to thereby transfer heat and moisture from the water to the air, temperature controlled means for supplying cool liquid to the body of water when a predetermined temperature is reached, and other means for supplying liquid to the body of water to maintain the level of the same substantially constant.

19. A material conditioning apparatus comprising a plurality of electric heating units for heating a body of liquid, means for utilizing the heated liquid to humidify a conditioning gas, a source of electric current, a plurality of electric circuits connected to said heating units and said source, automatic control means to break the circuit to some of said heating units a certain predetermined time after being placed in operation, and time controlled means for breaking the circuit to the remaining heating units.

20. A material conditioning apparatus comprising a plurality of electric heating units for heating a body of liquid, means for utilizing the heated liquid to humidify a conditioning gas, a source of electric current, a plurality of electric circuits connected to said heating units and said source, automatic control means to break the circuit to some of said heating units a certain predetermined time after the start, thermostatic control means for preventing the temperature rising beyond a predetermined limit, and time controlled means for breaking the circuit to the remaining heating units.

21. A material conditioning apparatus comprising means for heating a body of liquid, means for passing a conditioning gas in contact therewith to humidify the same, time controlled means for supplying a large number of heat units to the liquid at the start of the conditioning operation, and thermostatic control means for admitting cold water to the body of liquid to prevent the temperature rising beyond a predetermined limit.

22. A material conditioning apparatus comprising means for heating a body of liquid, means for utilizing the heated liquid to both humidify and heat a conditioning gas and time controlled means for supplying a larger number of heat units to the liquid for a determined time at the start of the conditioning operation than are supplied subsequently, and thermostatic control means for preventing the temperature rising beyond a predetermined limit.

23. In a material conditioning device, means for moving a relatively thin stream of air along the surface of a body of water whose surface area is sufficiently extensive to insure a maximum degree of humidification of the air stream passing thereover, heating means adapted to supply heat through the water only, time controlled means for regulating the operation of the heating means, temperature controlled means for regulating the operation of the heating means, and means for directing the humidified air into contact with the material to be treated.

GORDON D. HARRIS.